(12) United States Patent
Iwaguchi et al.

(10) Patent No.: US 10,054,736 B2
(45) Date of Patent: Aug. 21, 2018

(54) OPTICAL FIBER

(71) Applicant: SUMITOMO ELECTRIC INDUSTRIES, LTD., Osaka-shi, Osaka (JP)

(72) Inventors: Noriaki Iwaguchi, Yokohama (JP); Masuo Iida, Osaka (JP); Kentaro Okamoto, Osaka (JP); Takashi Fujii, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/800,304

(22) Filed: Nov. 1, 2017

(65) Prior Publication Data

US 2018/0128969 A1   May 10, 2018

(30) Foreign Application Priority Data

Nov. 7, 2016 (JP) .................................. 2016-217190

(51) Int. Cl.
   *G02B 6/02* (2006.01)
(52) U.S. Cl.
   CPC .............................. *G02B 6/02395* (2013.01)
(58) Field of Classification Search
   CPC ................................................. G02B 6/02395
   See application file for complete search history.

(56) References Cited

U.S. PATENT DOCUMENTS 6,849,333 B2 * 2/2005 Schissel ............... C03C 25/106
                                                                385/123
2015/0131956 A1    5/2015 Iwaguchi et al.

FOREIGN PATENT DOCUMENTS

| EP | 0260842 A2 | 3/1988 |
| WO | WO-2011049607 A1 | 4/2011 |
| WO | WO 2014/168201 A1 | 10/2014 |
| WO | WO-2017100122 A1 | 6/2017 |

* cited by examiner

*Primary Examiner* — John M Bedtelyon
(74) *Attorney, Agent, or Firm* — Drinker Biddle & Reath LLP

(57) ABSTRACT

An optical fiber comprises a glass fiber and a coating resin layer covering the glass fiber, the coating resin layer having a primary resin layer and a secondary resin layer, the primary resin layer comprising a cured resin composition obtained by curing a resin composition comprising an oligomer, a monomer, and a photopolymerization initiator, wherein the oligomer is a reaction product of a polyol compound, an isocyanate compound, and a hydroxyl group-containing (meth)acrylate compound; a proportion of a primary hydroxyl group of hydroxyl groups included in the polyol compound is 3.5% or less; and a Young's modulus of the secondary resin layer at −40° C. is 1780 MPa or more.

5 Claims, 1 Drawing Sheet

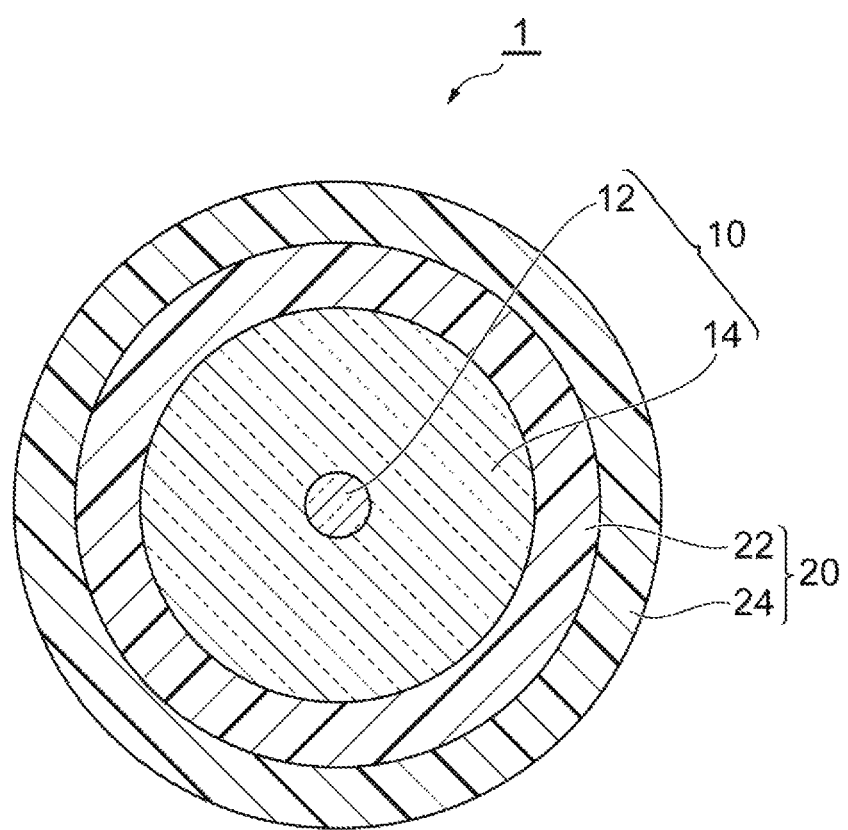

OPTICAL FIBER

TECHNICAL FIELD

The present invention relates to optical fibers.

The present application claims priority based on Japanese Patent Application No. 2016-217190 filed on Nov. 7, 2016, and the entire content described in the Japanese Patent Application is incorporated.

BACKGROUND

Generally, optical fibers has a coating resin layer to protect a glass fiber thereof. For instance, WO2014/168201 discloses a coated optical fiber having a primary coating layer and a secondary coating layer.

SUMMARY

As the diameter of an optical fiber cable becomes smaller and the cable has more optical fibers, there is a need to increase low-temperature properties of the optical fibers. Here, low-temperature properties are the increase in transmission loss when lateral pressure is applied at low temperatures. A small increase in this transmission loss is deemed to provide excellent low-temperature properties.

An object of the present invention is to provide optical fibers having excellent low-temperature properties.

To achieve the above object, an aspect of the present invention provides an optical fiber comprising a glass fiber and a coating resin layer covering the glass fiber, the coating resin layer having a primary resin layer and a secondary resin layer, the primary resin layer comprising a cured resin composition obtained by curing a resin composition comprising an oligomer, a monomer, and a photopolymerization initiator, wherein the oligomer is a reaction product of a polyol compound, an isocyanate compound, and a hydroxyl group-containing (meth)acrylate compound; a proportion of a primary hydroxyl group of hydroxyl groups included in the polyol compound is 3.5% or less; and a Young's modulus of the secondary resin layer at −40° C. is 1780 MPa or more.

The present invention can provide optical fibers having excellent low-temperature properties.

BRIEF DESCRIPTION OF THE DRAWINGS

FIG. 1 is a schematic cross-sectional view illustrating an example of an optical fiber according to an embodiment of the present invention.

DETAILED DESCRIPTION

Description of Embodiments of the Present Invention

First, the specifics of an embodiment of the present invention will be listed and described. An optical fiber according to an aspect of the present invention comprises a glass fiber and a coating resin layer covering the glass fiber, the coating resin layer having a primary resin layer and a secondary resin layer, the primary resin layer comprising a cured resin composition obtained by curing a resin composition comprising an oligomer, a monomer, and a photopolymerization initiator, wherein the oligomer is a reaction product of a polyol compound, an isocyanate compound, and a hydroxyl group-containing (meth)acrylate compound; a proportion of a primary hydroxyl group of hydroxyl groups included in the polyol compound is 3.5% or less; and a Young's modulus of the secondary resin layer at −40° C. is 1780 MPa or more.

Here, the polyol compound is a compound having two or more hydroxyl groups and examples of the hydroxyl groups include a primary hydroxyl group and a secondary hydroxyl group. The present inventors have found that when a polyol compound in which the proportion of a primary hydroxyl group is low is used as a polyol compound constituting an oligomer used for the formation of a primary resin layer and the Young's modulus of a secondary resin layer at a low temperature is set to be large, an increase in transmission loss at low temperatures can be reduced and low-temperature properties are excellent, thereby leading to completion of the present invention.

The proportion of a primary hydroxyl group of terminal hydroxyl groups included in the polyol compound may be 2.5% or less and the Young's modulus of the secondary resin layer at −40° C. may be 1970 MPa or more. These can further reduce the increase in transmission loss at low temperatures to further improve the low-temperature properties.

From the viewpoint of making an optical cable have many optical fibers, the outer diameter of each optical fiber may be 210 μm or less. The outer diameter of each optical fiber is generally about 250 μm and as each optical fiber becomes thinner, the transmission loss is more likely to deteriorate. By contrast, if a thin (thin coating resin layer) optical fiber is provided with the secondary resin layer according to the above embodiment, an increase in transmission loss at low temperatures can be reduced.

From the viewpoint of the Young's modulus, the polyol compound may be an aliphatic polyether polyol having an average molecular weight of 5000 or less.

The secondary resin layer may contain a pigment or a dye. In this case, the secondary resin layer is a colored layer, and this makes the resulting optical fiber easily distinguishable.

Details of Embodiments of the Present Invention

Hereinafter, specific examples of the optical fiber according to an embodiment of the present invention will be described by referring to the Drawing. Note that the present invention is not limited to these examples and is defined by the Claims, and it is intended that all the modifications within the meanings and scope of the Claims and their equivalents are included. In the following description, the same elements have the same reference signs in the description of the Drawing and redundant explanation is omitted.

(Optical Fiber)

FIG. 1 is a schematic cross-sectional view illustrating an example of an optical fiber according to an embodiment of the present invention. An optical fiber 1 is provided with a glass fiber 10, which is an optical transmission medium, and a coating resin layer 20.

The glass fiber 10 has a core 12 and a cladding 14 and is made of a glass member such as $SiO_2$ glass. The glass fiber 10 transmits light introduced into the optical fiber 1. The core 12 is provided, for example, in a region containing the center axis of the glass fiber 10. The core 12 may be made of pure $SiO_2$ glass and may further contain, for example, $GeO_2$ or fluorine. The cladding 14 is provided in a region surrounding the core 12. The cladding 14 has a refractive index lower than the refractive index of the core 12. The cladding 14 may be made of pure $SiO_2$ glass or may be made of fluorine-containing $SiO_2$ glass.

The outer diameter of the glass fiber 10 is usually about 125 μm. The outer diameter of the optical fiber 1 is preferably 260 μm or less and may be 210 μm or less. In addition, the lower limit of the outer diameter of the optical fiber 1 is about 190 μm.

The coating resin layer 20 has a primary resin layer 22, which is a first layer in contact with the glass fiber, and a secondary resin layer 24, which is a second layer in contact with the first layer. The total thickness of the coating resin layer 20 is preferably 32.5 to 67.5 μm and may be 32.5 to 42.5 μm.

The low-temperature properties of the optical fiber tend to be better as the primary resin layer becomes softer and the secondary resin layer becomes harder at −40° C. As used herein, the coating resin layer is generally formed of a urethane oligomer-containing resin composition, and it is known that the urethane oligomer is a reaction product of a polyol compound with an isocyanate compound. The polyol compound has hydroxyl groups. Because a primary hydroxyl group causes less steric hindrance than a secondary hydroxyl group, a higher proportion of the secondary hydroxyl group of the hydroxyl groups makes the urethane oligomer bulkier and more unlikely to aggregate at low temperatures. Therefore, it is predicted that the Young's modulus of the coating resin layer at low temperatures decreases. In addition, because the oligomer content of a resin composition used for the formation of the primary resin layer is higher than that of a resin composition used for the formation of the secondary resin layer, the primary resin layer is more susceptible to the steric hindrance derived from the secondary hydroxyl group than the secondary resin layer.

The Young's modulus of the primary resin layer 22 at −40° C. is preferably 1 to 40 MPa and more preferably 1 to 20 MPa or less.

The Young's modulus of the secondary resin layer 24 is higher than that of the primary resin layer 22. From the viewpoint of improving the low-temperature properties, the Young's modulus of the secondary resin layer 24 at −40° C. is 1780 MPa or more, preferably 1900 MPa or more, and more preferably 1970 MPa or more. The upper limit of the Young's modulus of the secondary resin layer 24 at −40° C. is not particularly limited and may be 2500 MPa or less.

The primary resin layer 22 can be formed by curing a UV-curable resin composition comprising a specific oligomer, a monomer, and a photopolymerization initiator.

The above oligomer is a (meth)acryloyl group-containing urethane oligomer obtained by reacting a polyol compound, an isocyanate compound, and a hydroxyl group-containing (meth)acrylate compound. Two or more oligomers may be mixed and used. The oligomer is contained preferably at 40 to 80 mass % in a resin composition used for the formation of the primary resin layer.

From the viewpoint of improving the low-temperature properties, the proportion of a primary hydroxyl group of hydroxyl groups included in the polyol compound is 3.5% or less, preferably 3.0% or less, and more preferably 2.5% or less. The lower limit of the proportion of a primary hydroxyl group included in the polyol compound is not particularly limited and may be 1.5% or more. The proportion of a primary hydroxyl group included in the polyol compound can be calculated by NMR measurement of the oligomer.

Examples of the polyol compound include aliphatic polyether polyols such as polypropylene glycol and polyethylene glycol. From the viewpoint of the Young's modulus, the polyol compound is preferably an aliphatic polyether polyol having an average molecular weight of 5000 or less and more preferably a polypropylene glycol having an average molecular weight of 1000 to 4500. The molecular weight of the polyol compound can be determined, for example by mass spectrometry.

Examples of the isocyanate compound include 2,4-tolylene diisocyanate, 2,6-tolylene diisocyanate, isophorone diisocyanate, and dicyclohexylmethane 4,4'-diisocyanate.

Examples of the hydroxyl group-containing (meth)acrylate compound include 2-hydroxyethyl (meth)acrylate, 2-hydroxybutyl (meth)acrylate, 4-hydroxybutyl (meth)acrylate, 2-hydroxypropyl (meth)acrylate, 1,6-hexanediol mono(meth)acrylate, pentaerythritol tri(meth)acrylate, and tripropylene glycol di(meth)acrylate.

As used herein, the (meth)acrylate means an acrylate or a corresponding methacrylate. The same also applies to a (meth)acrylic acid.

The monomer is incorporated in a molecular chain of the oligomer and functions as a reactive diluent. As the monomer, it is possible to use a monofunctional monomer having one polymerizable group or a multifunctional monomer having two or more polymerizable groups. Two or more monomers may be mixed and used.

Examples of the monofunctional monomer include: N-vinyl monomers having a cyclic structure, such as N-vinylpyrrolidone, N-vinyl caprolactam, and (meth)acryloyl morpholine; and (meth)acrylate compounds such as isobornyl (meth)acrylate, tricyclodecanyl (meth)acrylate, benzyl (meth)acrylate, dicyclopentanyl (meth)acrylate, 2-hydroxyethyl (meth)acrylate, ethoxylated nonylphenyl (meth)acrylate, phenoxyethyl (meth)acrylate, polypropylene glycol mono(meth)acrylate, lauryl (meth)acrylate, isooctyl (meth)acrylate, and isodecyl (meth)acrylate. Among them, N-vinyl monomers having a cyclic structure are preferable from the viewpoint of increasing the curing rate.

Examples of the multifunctional monomer include polyethylene glycol di(meth)acrylate, tricyclodecanediyldimethylene di(meth)acrylate, 1,6-hexanediol (meth)acrylate, tripropylene glycol di(meth)acrylate, trimethylolpropane tri(meth)acrylate, di(meth)acrylate of an ethylene oxide or propylene oxide adduct diol of a bisphenol compound, and epoxy (meth)acrylate in which di(meth)acrylate is added to glycidyl ether of a bisphenol compound.

When the usage temperature of the optical fiber is low, the physical properties (e.g., elongation) of the coating resin layer should not be changed rapidly. For this purpose, the glass transition temperature (Tg) of the primary resin layer is preferably lower than the lower limit of the usage temperature. Because the transmission loss at −40° C. is unlikely to increase, the monomer is preferably a monomer characterized in that the Tg of a homopolymer formed by homopolymerization of the monomer is 5° C. or less, and more preferably a monomer characterized in that the Tg is 0° C. or less. Among the above-mentioned monomers, preferable examples include 2-hydroxyethyl (meth)acrylate, ethoxylated nonylphenyl (meth)acrylate, phenoxyethyl (meth)acrylate, lauryl acrylate, isooctyl (meth)acrylate, and isodecyl (meth)acrylate.

As the photopolymerization initiator, one appropriately selected from known photo-radical polymerization initiators can be used. Examples of the photopolymerization initiator include acylphosphine oxide-based initiators and acetophenone-based initiators. Two or more photopolymerization initiators may be mixed and used. The photopolymerization initiator is contained preferably at 0.1 to 5 mass % in a resin composition used for the formation of the resin layer.

Examples of the acylphosphine oxide-based initiators include 2,4,6-trimethylbenzoyl diphenylphosphine oxide (trade name: "Lucirin TPO"; manufactured by BASF Inc.), 2,4,4-trimethylpentyl phosphine oxide, and 2,4,4-trimethylbenzoyl diphenylphosphine oxide.

Examples of the acetophenone-based initiators include 1-hydroxycyclohexan-1-yl phenyl ketone (trade name: "Irgacure 184"; manufactured by BASF Inc.), 2-hydroxy-2-methyl-1-phenyl-propan-1-one (trade name: "Darocur 1173"; manufactured by BASF Inc.), 2,2-dimethoxy-1,2-diphenylethan-1-one (trade name: "Irgacure 651"; manufactured by BASF Inc.), 2-methyl-1-(4-methylthiophenyl)-2-morpholinopropan-1-one (trade name: "Irgacure 907"; manufactured by BASF Inc.), 2-benzyl-2-dimethylamino-1-(4-morpholinophenyl)-butanone-1 (trade name: "Irgacure 369"; manufactured by BASF Inc.), 1-hydroxycyclohexyl phenyl ketone, 2,2-dimethoxy-2-phenylacetophenone, and 1-(4-isopropylphenyl)-2-hydroxy-2-methylpropan-1-one.

From the viewpoint of improving the curing performance of the primary resin layer, a phosphorus-containing acylphosphine oxide-based initiator is preferably used as the photopolymerization initiator.

The secondary resin layer 24 can be formed, for example, by curing a UV-curable resin composition containing an oligomer, a monomer, and a photopolymerization initiator (provided that this composition is different from a resin composition used for the formation of the primary resin layer 22). As the photopolymerization initiator added to the secondary resin layer 24, one appropriately selected from the above-mentioned examples used for the primary resin layer 22 can be used. The oligomer is contained preferably at 20 to 60 mass % in a resin composition used for the formation of the secondary resin layer.

Note that the secondary resin layer 24 constituting the coating resin layer 20 may be surrounded by a colored layer that is an ink layer so as to distinguish one optical fiber from another. Alternatively, the secondary resin layer 24 may be a colored layer.

From the viewpoint of improving how to distinguish one optical fiber from another, the colored layer preferably contains a pigment or a dye. Example of the pigment include: color pigments such as carbon black, titanium oxide, and zinc flower; and inorganic pigments such as magnetic powders (e.g., γ-$Fe_2O_3$, a mixed crystal of γ-$Fe_2O_3$ and γ-$Fe_3O_4$, $CrO_2$, cobalt ferrite, cobalt-adhered iron oxide, barium ferrite, Fe—Co, Fe—Co—Ni), MIO, zinc chromate, strontium chromate, aluminum tripolyphosphate, zinc, alumina, glass, and mica. In addition, organic pigments such as azo pigments, phthalocyanine pigments, and dyeing lake pigments can also be used. The pigments may be subjected to treatments such as various surface modifications and conversion into a composite pigment.

EXAMPLES

The present invention will be described in detail by referring to Examples, but the present invention is not limited to these Examples.

[Preparation of Resin Composition Used for Formation of Primary Resin Layer]

Each resin composition used for the formation of a primary resin layer was prepared by mixing 2,4,6-trimethylbenzoyl diphenylphosphine oxide (trade name: "Lucirin TPO"; manufactured by BASF Inc.), N-vinyl caprolactam, an ethoxylated nonylphenyl acrylate, and a urethane acrylate obtained by reacting a polypropylene glycol with a diisocyanate and hydroxyethyl acrylate, such that the Young's modulus of the primary resin layer was 12 MPa at −40° C. In addition, as the polypropylene glycol, each polypropylene glycol having a proportion of a primary hydroxyl group as shown in Table 1 or 2 was used.

[Preparation of Resin Composition Used for Formation of Secondary Resin Layer]

Each resin composition used for the formation of a secondary resin layer was prepared by mixing Irgacure 184, Lucirin TPO, 1,6-hexanediol diacrylate, a bisphenol-based epoxy acrylate, and a urethane acrylate obtained by reacting a polypropylene glycol with a diisocyanate and hydroxyethyl acrylate, such that the Young's modulus of the secondary resin layer was as shown in Table 1 or 2.

[Manufacturing of Optical Fibers]

In Examples 1 to 5, 7, and 9 and Comparative Examples 1 to 5, optical fibers having an outer diameter of 245 μm were manufactured by forming a primary resin layer having a thickness of 35 μm on the circumference of a glass fiber having an outer diameter of 125 μm composed of a core and a cladding, and then by forming a secondary resin layer having a thickness of 25 μm on the circumference of the primary resin layer.

In Examples 6, 8, and 10, optical fibers having an outer diameter of 200 μm were manufactured by forming a primary resin layer having a thickness of 17.5 μm on the circumference of a glass fiber having an outer diameter of 125 μm composed of a core and a cladding, and then by forming a secondary resin layer having a thickness of 20 μm on the circumference of the primary resin layer.

In Example 11, an optical fiber having an outer diameter of 200 μm was manufactured by forming a primary resin layer having a thickness of 17.5 μm on the circumference of a glass fiber having an outer diameter of 125 μm composed of a core and a cladding, and then by forming a colored secondary resin layer having a thickness of 20 μm on the circumference of the primary resin layer. Note that Example 11 used a resin composition used for the formation of the secondary resin layer, wherein 5 parts by mass of an organic pigment was mixed into the resin composition.

[Evaluation of Optical Fibers]

The low-temperature properties of the optical fibers manufactured were evaluated. Results are shown in Tables 1 to 2.

(Young's Modulus of Secondary Resin Layer)

First, each optical fiber was soaked in a solvent (ethanol:acetone=3:7) and the coating resin layer was pulled out from the glass fiber to prepare a sample (having a length of 50 mm or more). Then, the sample was used for a tensile test (gauge length: 25 mm) at −40° C. to determine the Young's modulus of the secondary resin layer from a 2.5% secant modulus.

(Low-Temperature Properties)

Each optical fiber was wound around a glass bobbin to form a single layer of the optical fiber under a tension of 50 g; and the transmission characteristics of an optical signal having a wavelength of 1550 nm were measured under temperature conditions of 23° C. and −40° C. to calculate the transmission loss at 23° C. and −40° C., respectively. If the difference calculated by subtracting the transmission loss at 23° C. from the transmission loss at −40° C. was less than 0 dB/km, the low-temperature properties were rated A; if the difference was 0 dB/km or more and less than 0.01 dB/km, the low-temperature properties were rated B; and if the difference was 0.01 dB/km or more, the low-temperature properties were rated C. Then, rating B and higher were acceptable.

TABLE 1

| Example | Primary resin layer Proportion (%) of primary hydroxyl group | Secondary resin layer Young's modulus (MPa) at −40° C. | Low-temperature properties |
|---|---|---|---|
| 1 | 3.5 | 1830 | B |
| 2 | 2.5 | 1780 | B |
| 3 | 1.7 | 1880 | B |
| 4 | 3.2 | 1992 | B |
| 5 | 2.5 | 2020 | A |
| 6 | 1.5 | 2010 | A |
| 7 | 1.8 | 1973 | A |
| 8 | 2.2 | 2040 | A |
| 9 | 2.1 | 2090 | A |
| 10 | 2.0 | 1980 | A |
| 11 | 2.0 | 1980 | A |

TABLE 2

| Comparative Example | Primary resin layer Proportion (%) of primary hydroxyl group | Secondary resin layer Young's modulus (MPa) at −40° C. | Low-temperature properties |
|---|---|---|---|
| 1 | 5.0 | 1811 | C |
| 2 | 4.0 | 1799 | C |
| 3 | 6.0 | 1760 | C |
| 4 | 5.0 | 1580 | C |
| 5 | 3.5 | 1680 | C |

The optical fibers manufactured in the Examples were found to have excellent low-temperature properties because they had a small increase in the transmission loss at the low temperature.

What is claimed is:

1. An optical fiber comprising a glass fiber and a coating resin layer covering the glass fiber,
    the coating resin layer having a primary resin layer and a secondary resin layer,
    the primary resin layer comprising a cured resin composition obtained by curing a resin composition comprising an oligomer, a monomer, and a photopolymerization initiator,
    wherein the oligomer is a reaction product of a polyol compound, an isocyanate compound, and a hydroxyl group-containing (meth)acrylate compound,
    a proportion of a primary hydroxyl group of hydroxyl groups included in the polyol compound is 3.5% or less; and
    a Young's modulus of the secondary resin layer at −40° C. is 1780 MPa or more.

2. The optical fiber according to claim 1, wherein the proportion of the primary hydroxyl group is 2.5% or less and the Young's modulus is 1970 MPa or more.

3. The optical fiber according to claim 1, wherein an outer diameter of the optical fiber is 210 urn or less.

4. The optical fiber according to claim 1, wherein the polyol compound is an aliphatic polyether polyol having a molecular weight of 5000 or less.

5. The optical fiber according to claim 1, wherein the secondary resin layer comprises a pigment or a dye.

* * * * *